United States Patent
Koh et al.

(10) Patent No.: US 7,453,580 B2
(45) Date of Patent: Nov. 18, 2008

(54) THREE-DIMENSIONAL IMAGE MEASURING APPARATUS

(75) Inventors: Kwang-Ill Koh, Seoul (KR); Eun-Hyoung Seong, Seoul (KR); Moon-Young Jeon, Yongin (KR)

(73) Assignee: Koh Young Technology, Inc., Seoul (KR)

( * ) Notice: Subject to any disclaimer, the term of this patent is extended or adjusted under 35 U.S.C. 154(b) by 173 days.

(21) Appl. No.: 10/542,919

(22) PCT Filed: Feb. 5, 2004

(86) PCT No.: PCT/KR2004/000204

§ 371 (c)(1),
(2), (4) Date: Feb. 13, 2006

(87) PCT Pub. No.: WO2004/070316

PCT Pub. Date: Aug. 19, 2004

(65) Prior Publication Data

US 2006/0158664 A1    Jul. 20, 2006

(30) Foreign Application Priority Data

Feb. 6, 2003    (KR) ...................... 10-2003-0007570
Feb. 6, 2003    (KR) ...................... 10-2003-0007571

(51) Int. Cl.
*G01B 11/24* (2006.01)

(52) U.S. Cl. ................ 356/602; 356/601; 356/605; 356/608

(58) Field of Classification Search ........... 356/237, 356/375–376, 601–608

See application file for complete search history.

(56) References Cited

U.S. PATENT DOCUMENTS

| 4,971,445 A | * | 11/1990 | Sato et al. ............... 356/601 |
| 5,175,601 A | | 12/1992 | Fitts |
| 5,450,204 A | * | 9/1995 | Shigeyama et al. ........ 356/604 |
| 6,094,760 A | * | 8/2000 | Nonaka et al. ............ 600/410 |
| 6,183,186 B1 | * | 2/2001 | Howells et al. ............ 414/937 |
| 7,040,945 B2 | * | 5/2006 | Yabe ......................... 427/356 |
| 2006/0268276 A1 | * | 11/2006 | Tajima ...................... 356/436 |

FOREIGN PATENT DOCUMENTS

JP    07-248212    9/1995
WO    WO02/43402 A1    5/2002

* cited by examiner

*Primary Examiner*—L. G. Lauchman
*Assistant Examiner*—Iyabo S Alli
(74) *Attorney, Agent, or Firm*—Lahive & Cockfield, LLP

(57) ABSTRACT

The present invention relates to a three-dimensional image measuring apparatus comprising: an XYZ shaft transfer means mounted onto a base member; a work stage mounted to the base member, for moving a measuring object to a measuring position and thereafter supporting it and having a predetermined reference surface set at a side thereof; an image obtaining means in which it is moved toward X, Y and Z shafts by the XYZ shaft transfer means, scans a grating image by the frequency of N times to a side of the measuring object supported and fixed to the work stage, obtains the changed grating image by the measuring object by N times; a light emitting means mounted to a side of the image obtaining means for generating and emitting light with a predetermined wavelength; and a control unit which irradiates light generated from the light emitting means mounted to a side of the image obtaining means to the reference surface set the side of the work stage, receives the changed grating image obtained from the image obtaining means, thereby producing the three-dimensional image.

20 Claims, 7 Drawing Sheets

THREE-DIMENSIONAL IMAGE MEASURING APPARATUS

RELATED APPLICATIONS

This application is a National Stage filing of PCT/KR2004/000204 which claims priority to Korean Application No. 10-2003-0007571 filed Feb. 6, 2003 and Korean Application No. 10-2003-0007570 filed Feb. 6, 2003.

TECHNICAL FIELD

The present invention relates to a three-dimensional image measuring apparatus, more particularly, to a three-dimensional image measuring apparatus in which when measuring a three-dimensional image of a measuring object, a grating image is distributed and thereafter the distributed image is scanned alternately to a side and the other side of the measuring object, thereby capable of removing a shadow region generated when measuring the three-dimensional image.

BACKGROUND ART

A conventional art relating to the three-dimensional image measuring apparatus is disclosed in U.S. Pat. No. 4,794,550 (filed on Oct. 15, 1986, applicant: Eastman Kodak Company), which will be described hereinafter in accordance with an accompanying drawing.

FIG. 1 is a construction view of the three-dimensional image measuring apparatus in accordance with a conventional art. As shown in FIG. 1, light generated from a light source 1 is irradiated as horizontal light beam 1a having a period "d" of the grating image onto a surface 9 of the measuring object through a grating 2, which is moved toward "a" direction of an arrow by a grating transfer member 4, and a lens 3. The irradiated light is scattered by angle 1b and irradiated to a camera 7 having an image sensor 6 through a lens 5 and then a sample image is obtained. The obtained sample image is processed by a computer 8 and then a three dimensional image of the surface 3 of the measuring object is obtained and then the obtained three dimensional image is displayed by a display device 8b. Here, a keyboard 8a is used for inputting several information in order to measure moiré pattern.

As described above, there are several disadvantages that when measuring the three dimensional image by using the conventional moiré pattern, there is a shadow region, which is impossible to measure, at an arbitrary position of the measuring object, so that the three dimensional image of the measuring object can not be measured precisely.

DISCLOSURE OF THE INVENTION

Accordingly, it is a primary object of the present invention to provide a three dimensional image measuring apparatus in which when measuring a three-dimensional image of a measuring object, a grating image is distributed and thereafter the three dimensional image changed by the measuring object is obtained by scanning the distributed image by N times to a side and the other side of the measuring object, thereby obtaining three dimensional image, so that a shadow region is removed, thereby capable of more improving measuring precision of the three-dimensional image.

Another object of the present invention is to provide a three dimensional image measuring apparatus in which a projection portion and a 3-dimensional camera are arranged on a straight line, thereby constructing the three dimensional image measuring apparatus more compact.

In one aspect of the present invention, to achieve the above-described objects of the invention, there is provided a three-dimensional image measuring apparatus comprising: an XYZ shaft transfer means mounted onto a base member; a work stage mounted to the base member, for moving a measuring object to a measuring position and thereafter supporting it and having a predetermined reference surface set at a side thereof; an image obtaining means in which it is moved toward X, Y and Z shafts by the XYZ shaft transfer means, scans a grating image by the frequency of N times to a side of the measuring object supported and fixed to the work stage, obtains the changed grating image by the measuring object by N times and alternately, scans the grating image by the frequency of N times to the other side of the measuring object, obtains the changed grating image by the measuring object by N times; a light emitting means mounted to a side of the image obtaining means for generating and emitting light with a predetermined wavelength; and a control unit which, by controlling the work stage and the XYZ shaft transfer means, irradiates light generated from the light emitting means mounted to a side of the image obtaining means to the reference surface set the side of the work stage, thereafter receives the reflected light image through the image obtaining means, measures a vertical distance, thereby maintaining a focus distance between the measuring object and the image obtaining means constantly, and receives the changed grating image obtained from the image obtaining means, thereby producing the three-dimensional image.

The image obtaining means comprises: a projection portion which produces a grating image through a light source emitting light and a diffraction grating, in which it is installed to a lower side of the light source for receiving the light emitted from the light source and moved by a grating transfer apparatus, and penetrates the produced grating image through a projection optical system installed to a lower side of the diffraction grating; a distributor, which is installed to a lower side of the projection portion, distributes the grating image irradiated through a projection optical system of the projection portion through first and second mirrors transferred by a mirror transfer apparatus and distributes the grating image through third and fourth mirrors which are installed to be horizontal to the left/right side of the first and second mirrors and first and second filters; and an imaging unit which is installed to a lower side of the distributor, reflects horizontally the changed grating image in which it is penetrated through the first and second filters of the distributor and irritated to the measuring object and then reflected, through an imaging mirror, and obtains the changed grating image through an imaging lens and an imaging device to a camera.

BRIEF DESCRIPTION OF THE DRAWINGS

The present invention will become better understood with reference to the accompanying drawings which are given only by way of illustration and thus are not limitative of the present invention, wherein.

BEST MODE FOR CARRYING OUT THE INVENTION

A three-dimensional image measuring apparatus in accordance with preferred embodiments of the present invention will now be described in detail with reference to the accompanying drawings.

Figure 1:
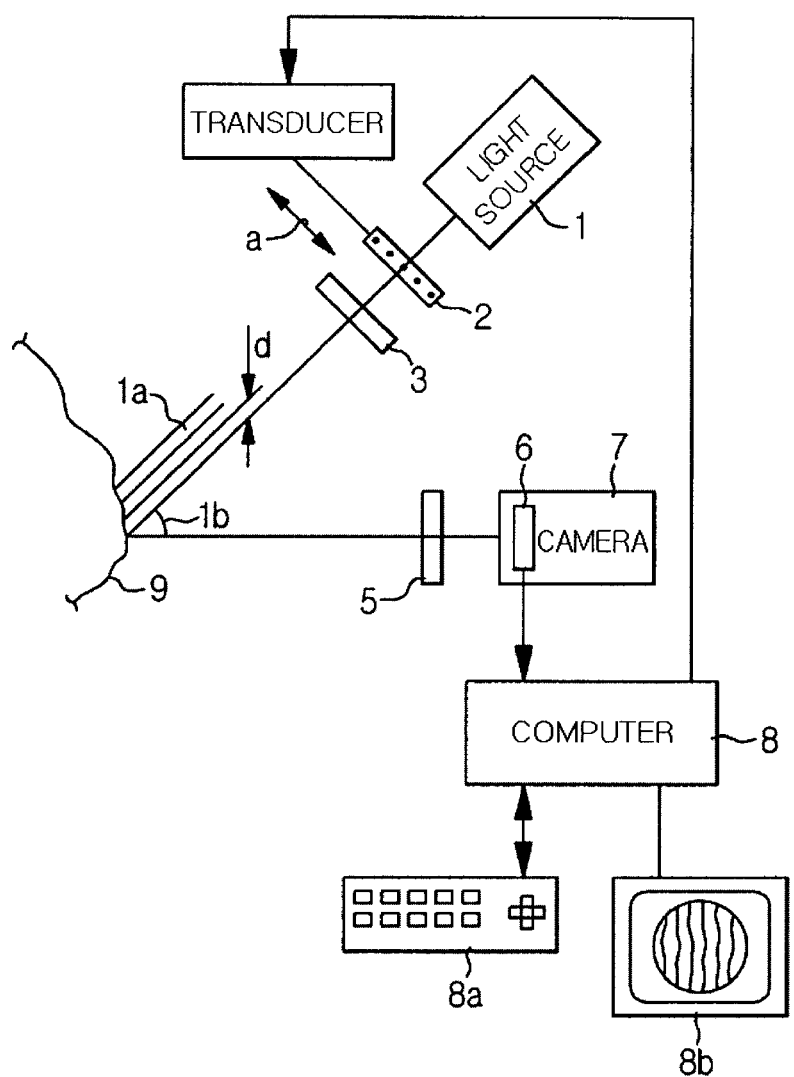
FIG. 1 is a construction view of a three-dimensional image measuring apparatus in accordance with the conventional art.
Figure 2:
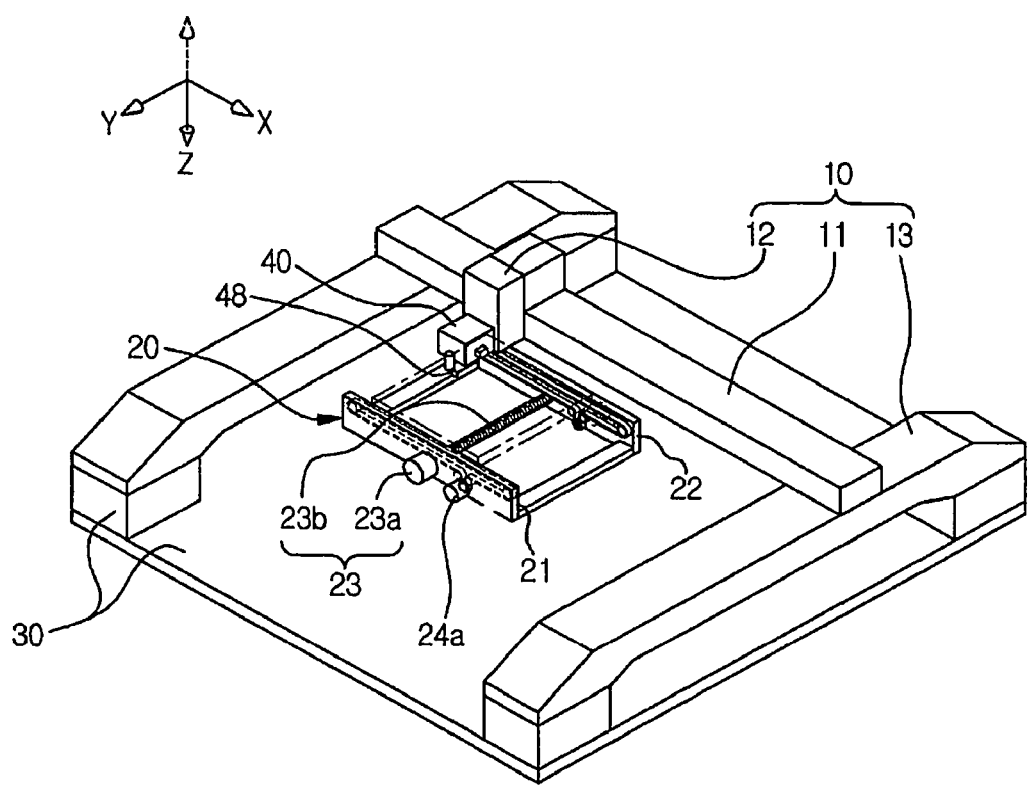
FIG. 2 is a perspective view illustrating the entire construction of a three-dimensional image measuring apparatus in accordance with the present invention.

FIG. 2 is a perspective view illustrating the entire construction of a three-dimensional image measuring apparatus in accordance with the present invention. As shown in FIG. 2, a work stage 20 is installed to an upper portion of a base member 30, an XYZ shaft transfer apparatus 10 is installed to an upper portion of the work stage 20, an image obtaining apparatus 40 is installed to the XYZ shaft transfer apparatus 10 which is freely moved toward X, Y and Z shafts for measuring a three-dimension image of a measuring object 100 (shown in FIG. 3), and a control unit 50(shown in FIG. 3) is installed to a side of the base member 30 for entirely controlling the image obtaining apparatus 40, the work stage 20 and the XYZ shaft transfer apparatus 10.

Figure 3:
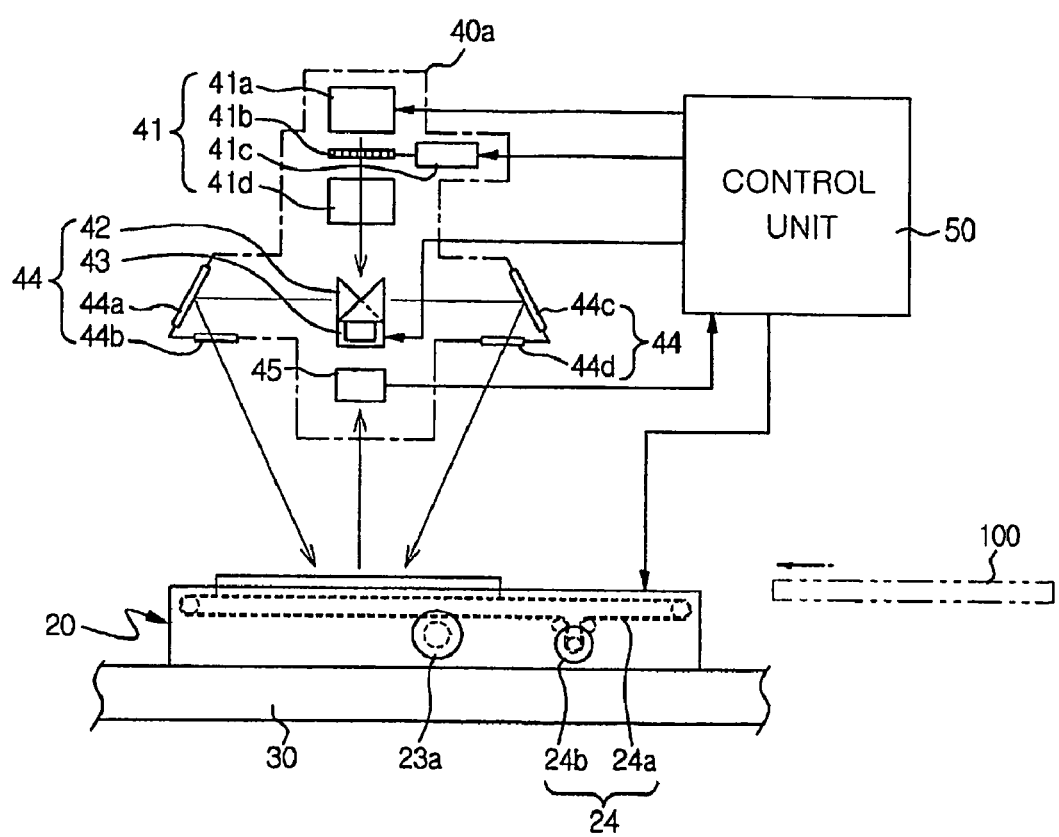
FIGS. 3 and 4 are construction views of an image obtaining apparatus shown in FIG. 2.
Figure 4:
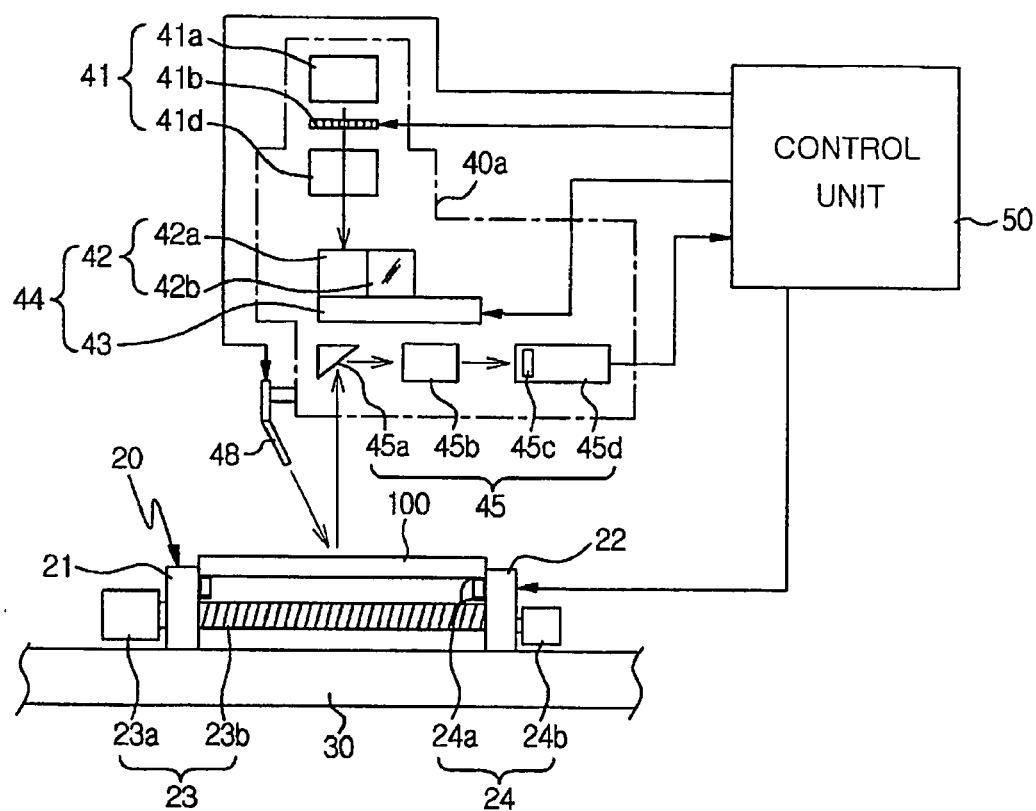

Any one between a linear motor or a ball screw is adapted as the XYZ shaft transfer apparatus 10 in order to transfer the image obtaining apparatus 40 toward X, Y and Z shafts, respectively. The work stage 20 which transfers the measuring object 100 to a measuring position, as shown in FIG. 2 to FIG. 4, comprises a first guide 21, a second guide 22 and a guide transfer apparatus 23.

The first guide 21 is installed to the base member 30 to be fixed and has a predetermined reference to a side thereof. The reference surface is set at an arbitrary position properly from an upper portion of the first guide 21 or an arbitrary position of the base member 30 so that the image obtaining apparatus 40 may receive light. The second guide 22 is installed in order to be transferred according to the size of the measuring object 100 on the basis of the first guide 21. For transferring the second guide 22, the guide transfer apparatus 23 is installed that the first and second guides 21 and 22, respectively, are crossed at right angles. The ball screw 23b adapted with a motor 23a is adapted to the guide transfer apparatus 23 and a motor 24a and a belt 24b are installed respectively at the insides of the first and second guides 21 and 22 for transferring the measuring object 100.

The control unit 50 first checks whether a focus between the measuring object 100 and the image obtaining apparatus 40 is correct, for measuring the measuring object 100. For this, the control unit 50 generates a light having a predetermined wavelength to a predetermined reference surface set a side of the work stage 20 by a light emitting apparatus 48 in which it is installed to a side of the image obtaining apparatus 40, that is, when seeing the image obtaining apparatus 40 from Y shaft direction, it is seen at a front side.

A laser pointer is used as the light emitting apparatus 48 for generating the light having a predetermined wavelength. Before measurement of the measuring object 100, the control unit 50 irradiates the light generated from the light emitting apparatus 48 to the reference surface, receives the reflected light image through the image obtaining apparatus 40, calculates a vertical distance between the reference surface and the image obtaining apparatus 40, and controls the distance of Z shaft direction of the image obtaining apparatus 40 by controlling the XYZ shaft transfer apparatus 10 according to the result, thereby maintaining the focus distance of the measuring object 100 and the image obtaining apparatus 40.

When the focus distance between the measuring object 100 and the image obtaining apparatus 40 is maintained constantly, the control unit 50 measures the three-dimensional image by controlling the image obtaining apparatus 40. For this, the control unit 50 first transfers the image obtaining apparatus 40 toward X, Y and Z shafts by controlling the XYZ shaft transfer apparatus 10 and then transfers it to the measuring object 100 supported and fixed to the work stage 20. When completing the transfer procedure, the image obtaining apparatus 40 scans a grating image to a side of the measuring object 100 by N times, obtains the grating image changed by the measuring object with N times, alternately scans a grating image to the other side of the measuring object and obtains the grating image changed by the measuring object with N times.

The control unit 50 receives the changed grating image that it is alternately scanned to a side and the other side of the measuring object 100 in the image obtaining apparatus 40 by N times and obtained, thereby producing the three-dimensional image of the measuring object 100. Here, the control unit 50 scans alternately grating image to a side and the other side of the measuring object 100 by N times by controlling the image obtaining apparatus 40, thereafter receives the changed grating image to the respective grating image and measures the three-dimensional image of the measuring object 100, so that more precise three-dimensional image is obtained by removing the shadow region.

A construction of the image obtaining apparatus 40 which scans alternately to a side and the other side of the measuring object 100 and thereafter obtains the changed grating image will be described with reference to the accompanying drawings of FIGS. 3 and 4.

FIG. 3 is a construction view that the image obtaining apparatus is seen at a front surface from a Y shaft direction. FIG. 4 is a construction view that the image obtaining apparatus is seen at a front surface from an X shaft direction. As shown in FIGS. 3 and 4, the image obtaining apparatus 40 can be constructed compactly as an outer case 40a of the image obtaining apparatus as depicted by a dotted line. That is, the obtaining apparatus 40 comprises a projection portion 41, a distributor 44 installed to a vertical lower portion of the projection portion 41, an imaging unit 45 installed to a vertical lower portion of the distributor 44.

The projection portion 41 produces a grating image through a light source 41a emitting light and a diffraction grating 41b which is installed to a lower side of the light source 41a for receiving the light emitted from the light source and moved by a grating transfer apparatus 41c, and penetrates the produced grating image through a projection optical system 41d installed to a lower side of the diffraction grating 41b. The grating image penetrated through the projection optical system 41d of the projection portion 41 is transferred to the distributor 44. Here, a liquid crystal diffraction grating can be adapted as the diffraction grating 41b and a PZT(piezoelectric) actuator is adapted as the grating transfer apparatus 41d.

The distributor 44, which is installed to a lower side of the projection optical system 41d of the projection portion 41, distributes the grating image irradiated from the projection optical system 41d through a grating image distributing mirror 42, which comprises first and second mirrors 42a and 42b, transferred by a mirror transfer apparatus, then penetrates the grating image to the third and fourth mirrors 44a and 44c which are installed to be horizontal to the left/right side of the first and second mirrors, thereafter filters by first and second filters 44b and 44d which are installed to the respective lower sides of the third and fourth mirrors 44a and 44c, and then scans to a side and the other side of the measuring object 100 by N times, respectively.

The grating image scanned to the measuring object 100 forms the changed grating image by the measuring object 100 and the changed grating image is received to the imaging unit 45. The imaging unit 45 is installed to a lower side of the distributor 44, reflects horizontally the changed grating image, in which it is penetrated through the first and second filters 44b and 44d of the distributor 44, scanned to a side and the other side of the measuring object 100 by N times, respectively, and formed through an imaging mirror 45a, and obtains the changed grating image through an imaging lens 45b and an imaging device 45c to a camera 45d. Here, the camera 45d obtains the changed grating image of the measuring object 100 with 2×N frames and transmits it to the control unit 50.

The control unit 50 obtains phase values by using the respective transmitted changed grating image, and by using the changed grating image obtained from a side and the other side of the measuring object 100 and removes the shadow region and saturation region by the obtained phase value, thereby capable of measuring three-dimensional image more precisely.

Figure 5:
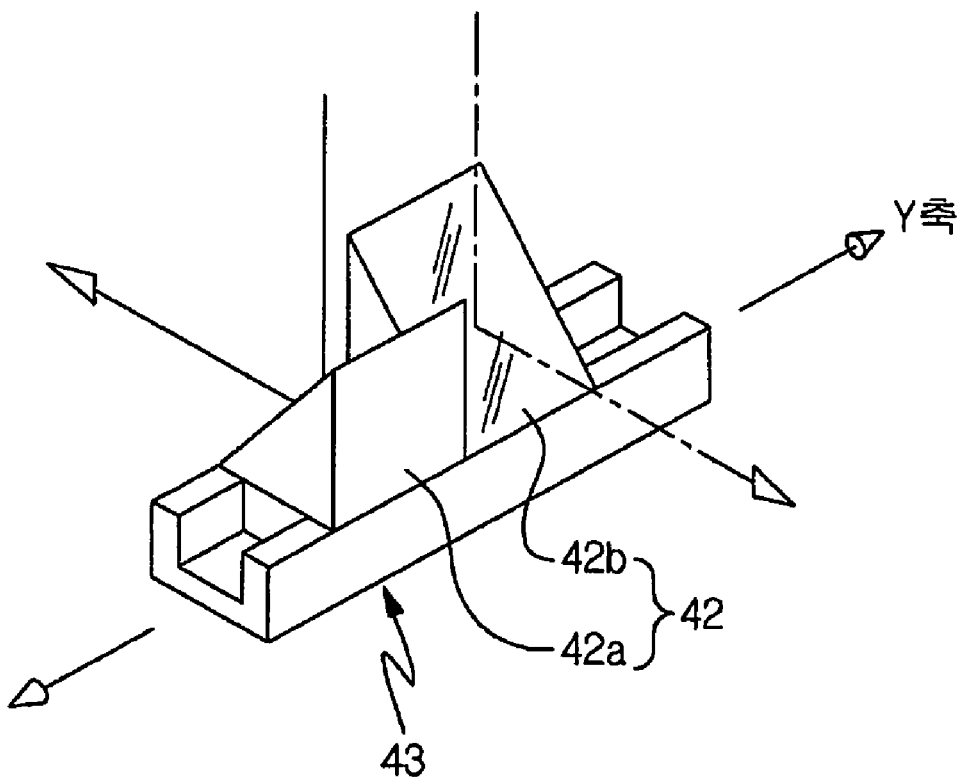
FIG. 5 is an enlarged perspective view of a distributor shown in FIG. 3.

In order to obtain a precise three-dimensional image of the measuring object 100, in the grating image distributing mirror 42 for distributing the grating image, as shown in FIG. 5, the center lines of each inclined mirror surface of a first mirror 42a and a second mirror 42b are crossed, contacted and formed. A grating image is scanned to a side of the measuring object by the first mirror 42a by N times and thereafter, it is transferred to a Y shaft direction by the mirror transfer apparatus 43 and a grating image is distributed and scanned to the other side of the measuring object 100 by the second mirror 42b by N times.

Figure 6:
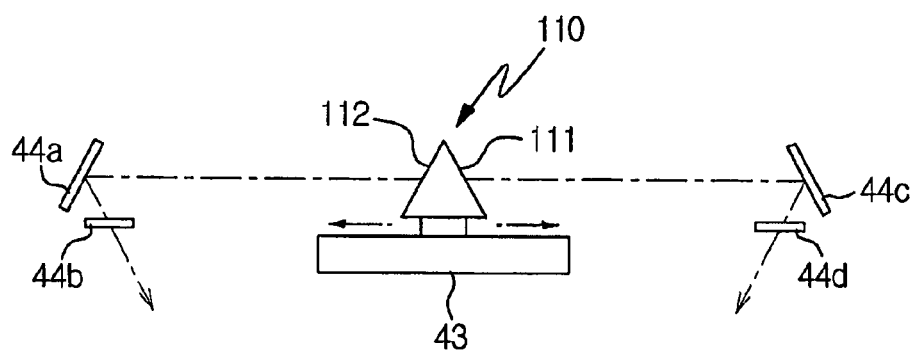
FIGS. 6 and 7 are views illustrating an embodiment of the distributor shown in FIG. 3.
Figure 7:
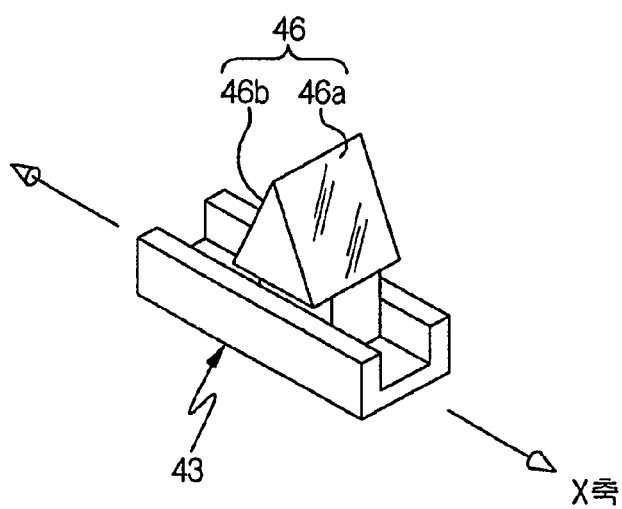

As an embodiment of the grating image distributing mirror 42, as shown in FIGS. 6 and 7, a triangle mirror 46 in which first and second mirrors 46a and 46b are formed the respective inclined surfaces can be adapted. By the first mirror 46a, the grating image is scanned to a side of the measuring object 100 (shown in FIG. 3) by N times through the third mirror 44a and the first filter 44b and thereafter, the triangle mirror 46 is transferred toward an X shaft direction by the mirror transfer apparatus 43 and the grating image is distributed by the second mirror 46b and the distributed grating image is scanned to the other side of the measuring object 100 through the fourth mirror 44c and the second filter 44d by N times alternately.

Figure 8:
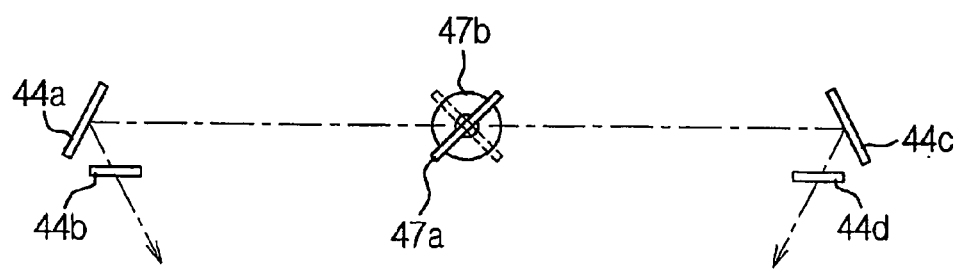
FIGS. 8 and 9 are views illustrating another embodiment of the distributor shown in FIG. 3.
Figure 9:
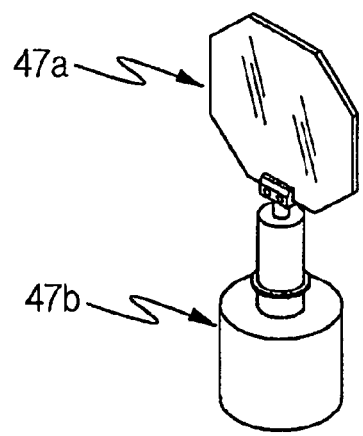

As another embodiment of the grating image distributing mirror 42, as shown in FIGS. 8 and 9, a rotation mirror 47a can be adapted. By the rotation mirror 47a, the grating image is scanned to a side of the measuring object 100 through the third mirror 44a and the first filter 44b by N times, and thereafter as shown in FIG. 8, the rotation mirror 47a is rotated with a predetermined angle by a rotation member as a galvano mirror meter 47b (shown in FIG. 9) and the grating image is distributed by the fourth mirror 44c and the second filter 44d and the distributed grating image is scanned to the other side of the measuring object 100 by N times. Here, one among an air cylinder, a linear motor and a ball screw is adapted as the mirror transfer apparatus 42a, as a straight movement member, for moving the grating image distributing mirror 42. A galvano mirror meter is used as a rotation apparatus 47b which is used as a rotation member for rotating the rotation mirror 47a.

As above, when measuring the three-dimensional image of the measuring object, the grating image is scanned to a side and the other side of the measuring object by N times alternately, and then changed grating image is obtained, so that the shadow region and saturation regions are removed by using phase values obtained from a side and the other side respectively, thereby capable of measuring three-dimensional image more precisely.

INDUSTRIAL APPLICABILITY

As described above, there are advantages that the grating image is scanned to a side and the other side of the measuring object by N times alternately, and then changed grating image is obtained, so that the shadow region and saturation regions are removed by using phase values obtained from a side and the other side respectively, thereby capable of measuring three-dimensional image more precisely, and a projection portion, a distributor and an imaging unit are arranged on a straight line with vertical direction, thereby constructing the three dimensional image measuring apparatus more compact.

The invention claimed is:

1. A three-dimensional image measuring apparatus comprising:

an XYZ shaft transfer means mounted onto a base member;

a work stage having first and second guides and a guide transfer apparatus mounted to the base member, for moving a measuring object to a measuring position and thereafter supporting it and having a predetermined reference surface set at a side thereof;

an image obtaining means moving along X, Y and Z shafts by the XYZ shaft transfer means, scanning a grating image by the frequency of N times to one side of the measuring object and, at the same time, to the other side of the measuring object supported and fixed to the work stage, obtaining the grating image changed by the one side of the measuring object by N times and obtaining the grating image changed by the other side of the measuring object by N times;

a light emitting means mounted to a side of the image obtaining means for generating and emitting light with a predetermined wavelength; and a control unit which, by controlling the work stage and the XYZ shaft transfer means, irradiates light generated from the light emitting means mounted to a side of the image obtaining means to the reference surface set the side of the work stage, thereafter receives the reflected light image through the image obtaining means, measures a vertical distance, thereby maintaining a focus distance between the measuring object and the image obtaining means constantly, and receives the changed grating image obtained from the image obtaining means, thereby producing the three-dimensional image.

2. The three-dimensional measuring apparatus according to claim 1, wherein the XYZ shaft transfer apparatus is applied any one between a linear motor or a ball screw in order to transfer the image obtaining apparatus toward X, Y and Z shafts, respectively.

3. The three-dimensional measuring apparatus according to claim 1, wherein the first guide is installed to the base member to be fixed and has a predetermined reference to a side thereof;

the second guide is installed in order to be transferred according to the size of the measuring object on the basis of the first guide; and the guide transfer apparatus is installed that the first and second guides, respectively, are crossed at right angles and for transferring the second guide on the basis of the first guide.

4. The three-dimensional measuring apparatus according to claim 1, wherein said guide transfer apparatus is a ball screw.

5. The three-dimensional measuring apparatus according to claim 1, the image obtaining means comprises:
   a projection portion which produces a grating image through a light source emitting light and a grating, in which it is installed to a lower side of the light source for receiving the light emitted from the light source and moved by a grating transfer apparatus, and penetrates the produced grating image through a projection optical system installed to a lower side of the grating;
   a distributor, which is installed to a lower side of the projection portion, distributes the grating image irradiated through a projection optical system of the projection portion through first and second mirrors transferred by a mirror transfer apparatus and distributes the grating image through third and fourth minors which are installed to be horizontal to the left/right side of the first and second mirrors and first and second filters; and
   an imaging unit which is installed to a lower side of the distributor, reflects horizontally the changed grating image in which it is penetrated through the first and second filters of the distributor and irritated to the measuring object and then reflected, through an imaging mirror, and obtains the changed grating image through an imaging lens and an imaging device to a camera.

6. The three-dimensional measuring apparatus according to claim 5, wherein the grating is adapted as a liquid crystal grating.

7. The three-dimensional measuring apparatus according to claim 5, wherein the grating transfer apparatus of the projection portion is adapted as a PZT(piezoelectric) actuator.

8. The three-dimensional measuring apparatus according to claim 5, wherein a first mirror and a second mirror of the distributor are crossed and formed at the center lines of each inclined mirror.

9. The three-dimensional measuring apparatus according to claim 5, wherein first and second mirrors of the distributor are adapted as a triangle mirror, respectively.

10. The three-dimensional measuring apparatus according to claim 5 or 6, wherein the mirror transfer apparatus is adapted as one among an air cylinder, a linear motor and a ball screw.

11. The three-dimensional measuring apparatus according to claim 5, wherein first and second mirrors of the distributor are adapted as a mirror rotation mirror.

12. The three-dimensional measuring apparatus according to claim 11, wherein the apparatus further comprises a rotation apparatus for rotating the rotation mirror with a predetermined angle.

13. The three-dimensional measuring apparatus according to claim 12, wherein said rotation apparatus is adapted as a galvano mirror meter.

14. The three-dimensional measuring apparatus according to claim 1, wherein a laser pointer is used as the light emitting means.

15. An apparatus for measuring an image of an object, the apparatus comprising:
    a light source emitting light;
    a diffraction grating disposed to receive the light emitted from the light source and to produce a grating image from the light;
    a distributor disposed to receive the grating image and to distribute the grating image to the object, the distributor including:
      a first mirror distributing the grating image to a first side of the object, and
      a second mirror distributing the grating image to a second side of the object, the second side of the object being opposite the first side of the object; and
    an imaging unit receiving the grating image reflected by the first side of the object and the second side of the object,
    wherein the light emitting source, the diffraction grating, the distributor, and the imaging unit are arranged substantially on a straight line.

16. The apparatus according to claim 15, further comprising:
    a third mirror disposed at a first side of the distributor to receive the grating image from the first mirror and to distribute the grating image to the first side of the object; and
    a fourth mirror disposed at a second side of the distributor to receive the grating image from the second mirror and to distribute the grating image to the second side of the object,
    wherein the first side of the distributor is opposite the second side of the distributor.

17. The apparatus according to claim 15, wherein the imaging unit alternately obtains the grating image from the first side of the object and the second side of the measuring object.

18. The apparatus according to claim 15, further comprising: an XYZ transfer device for moving the apparatus along X, Y and Z axes.

19. The apparatus according to claim 15, further comprising:
    a base member; and
    a work stage mounted on the base member for moving the object to a measuring position.

20. The apparatus according to claim 15, further comprising:
    a control unit for measuring the image of the object by removing shadow regions and saturation regions from the grating image received by the imaging unit using phase values obtained from the first side of the object and the second side of the object, respectively.

* * * * *